United States Patent
Hu et al.

(10) Patent No.: US 12,470,334 B2
(45) Date of Patent: Nov. 11, 2025

(54) SIGNAL COMMUNICATION BASED ON LEVITATED PARTICLE

(71) Applicants: ZHEJIANG LAB, Hangzhou (CN); ZHEJIANG UNIVERSITY, Zhejiang (CN)

(72) Inventors: Huizhu Hu, Hangzhou (CN); Zhenhai Fu, Hangzhou (CN); Xiaowen Gao, Hangzhou (CN); Xingfan Chen, Hangzhou (CN); Nan Li, Zhejiang (CN); Cheng Liu, Zhejiang (CN); Zhiming Chen, Hangzhou (CN); Jinsheng Xu, Hangzhou (CN); Shaochong Zhu, Hangzhou (CN); Yingying Wang, Hangzhou (CN); Peitong He, Hangzhou (CN)

(73) Assignees: ZHEJIANG LAB, Hangzhou (CN); ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/549,553

(22) PCT Filed: May 25, 2023

(86) PCT No.: PCT/CN2023/096175
§ 371 (c)(1),
(2) Date: Sep. 7, 2023

(87) PCT Pub. No.: WO2024/001624
PCT Pub. Date: Jan. 4, 2024

(65) Prior Publication Data
US 2025/0030509 A1    Jan. 23, 2025

(30) Foreign Application Priority Data
Jun. 27, 2022   (CN) .................. 202210732153.X

(51) Int. Cl.
*H04L 1/20*   (2006.01)
*H04L 27/00*   (2006.01)

(52) U.S. Cl.
CPC .............. *H04L 1/206* (2013.01); *H04L 1/203* (2013.01); *H04L 27/0014* (2013.01)

(58) Field of Classification Search
CPC ........ G01N 27/414; G01R 29/12; H02N 1/00; H02N 15/00; H03B 17/00; H04B 15/00;
(Continued)

(56) References Cited

U.S. PATENT DOCUMENTS 10,983,139 B1    4/2021   Krzyzewski et al.
2018/0348394 A1   12/2018  Wilson et al.

FOREIGN PATENT DOCUMENTS

CN    104283616 A    1/2015
CN    104406528 A    3/2015
(Continued)

OTHER PUBLICATIONS

ISA State Intellectual Property Office of the People's Republic of China, International Search Report Issued in Application No. PCT/CN2023/096175, Aug. 22, 2023, WIPO, 3 pages.
(Continued)

*Primary Examiner* — Shawkat M Ali
(74) *Attorney, Agent, or Firm* — Christopher R. Carroll; The Small Patent Law Group LLC

(57) ABSTRACT

The present disclosure provides a method and device for performing signal communication based on a levitated particle. In one example, the method includes: preparing a levitated state of the particle; regulating and measuring a net charge quantity carried by the levitated particle; calibrating electromagnetic response characteristics of the levitated particle; applying an electromagnetic communication signal; obtaining and demodulating the electromagnetic communi-
(Continued)

cation signal. In an example, the device includes: a levitation trapper; a charge measure-regulator; an electromagnetic response calibrator, configured to obtain, in advance, a background noise and an electromagnetic response transfer function of the levitated particle; a communication signal detect-demodulator, configured to detect a motion response of the levitated particle under an electromagnetic communication signal; based on the background noise and the electromagnetic response transfer function of the levitated particle, recover the applied electromagnetic communication signal from the detected motion response, and demodulate symbols of the electromagnetic communication signal.

10 Claims, 4 Drawing Sheets

(58) Field of Classification Search
CPC . H04L 1/20; H04L 1/203; H04L 1/206; H04L 27/00; H04L 27/0014
USPC .................................. 375/219, 295, 316, 340
See application file for complete search history.

(56) References Cited

FOREIGN PATENT DOCUMENTS

| | | | | |
|---|---|---|---|---|
| CN | 108645751 | A | 10/2018 | |
| CN | 109962732 | A | 7/2019 | |
| CN | 111398100 | A | 7/2020 | |
| CN | 112485163 | A | 3/2021 | |
| CN | 113804606 | A | 12/2021 | |
| CN | 114189172 | A | 3/2022 | |
| CN | 114414905 | A | 4/2022 | |
| CN | 114826851 | A | 7/2022 | |
| KR | 102306354 | B1 * | 9/2021 | ............. H02N 15/00 |
| TW | M603097 | U | 10/2020 | |
| WO | 2021248698 | A1 | 12/2021 | |

OTHER PUBLICATIONS

ISA State Intellectual Property Office of the People's Republic of China, Written Opinion of the International Searching Authority Issued in Application No. PCT/CN2023/096175, Aug. 22, 2023, WIPO, 6 pages.(Submitted with Machine/Partial Translation).
State Intellectual Property Office of the People's Republic of China, Office Action and Search Report Issued in Application No. 202210732153X, Aug. 9, 2022, 13 pages.(Submitted with Machine/Partial Translation).
Tian Yuan etc. "Technique and application of vacuum optical tweezers" Physics Experimentation vol. 41 No. 1 Jan. 30, 2021. 9 pages.
Tong Wang etc. "A novel single fiber optical tweezers based on GIMMF: simulation and experiment""2017 25th Optical Fiber Sensors Conference (OFS)" Jun. 2, 2017, 4 pages.

* cited by examiner

SIGNAL COMMUNICATION BASED ON LEVITATED PARTICLE

This application is a national stage of international PCT Application No. PCT/CN2023/096175 filed on May 25, 2023, and claims a priority to a Chinese Patent Application with the corresponding application number being 202210732153.X and the application date being Jun. 27, 2022, the entire contents of which are incorporated herein by reference.

TECHNICAL FIELD

The present disclosure relates to a method and device for performing signal communication based on a levitated particle.

BACKGROUND

The vacuum optical tweezers system is an optical mechanical system with an ultrahigh position detection sensitivity, which can trap and manipulate a levitated particle in a non-mechanical contact manner. In a vacuum optical tweezers system, the trapped levitated particle can naturally carry net charges. After the net charge quantity carried by the particle is regulated, the particle can be driven by applying electromagnetic communication signals to the vacuum optical tweezers system. In other words, with the applied electromagnetic communication signals, the motion state of the levitated particle can have a corresponding change.

In the related wireless communication method, an antenna is usually used as a device for sending and receiving wireless signals. The reception antenna can collect electromagnetic waves with a specific frequency transmitted in an air waveguide and convert them into electric signals for feeder transmission so as to realize the function of wireless communication. However, some disadvantages inherent to the antenna limit its further development.

Firstly, the antenna has a huge volume occupying a large space and usually is the bulkiest part in the entire communication system. In order to achieve the highest switching efficiency between transmission and reception of the antenna, the spacing between the antenna elements usually must be greater than half wireless signal wavelength. For example, in the high frequency band from 30 GHz to 300 GHz, the size of the antenna is at the magnitude of millimeter. Since the wireless signal wavelength is inversely proportional to the frequency, the lower the signal frequency is, the larger the wavelength is. For example, in the low frequency band from 30 kHz to 300 kHz, the wavelength corresponding to the signal is at the magnitude of kilometer. This causes the antenna corresponding to the signals of low-frequency band to occupy a huge land area, leading to low practical applicability. The most advanced antenna miniaturization technology can enable the size of the antenna to reach the magnitude of centimeter in the low frequency band. However, there is still a long way to go in achieving an ideal antenna size and the bottleneck technology is very difficult to break through.

In addition, the related antenna-based wireless communication system has the problem of low reception sensitivity (i.e., the minimum signal reception power of the antenna when the wireless device works normally). For example, the reception sensitivity of the Huawei ordinary high-frequency-band products usually is -85 dBm and those signals lower than -85 dBm cannot be detected by these products. For the wireless signals with weaker power, a revolutionary wireless communication method and device is urgently needed to achieve signal reception.

SUMMARY

In order to overcome the problem of huge antenna volume and low reception sensitivity of the related wireless communication system, the present disclosure provides a method and device for performing signal communication based on a levitated particle, which may not only utilize the advantage of smaller volume of the levitated particle but also obtain a higher signal reception sensitivity.

In the present disclosure, a levitation trapper is configured to trap a tiny particle and levitate the trapped particle in an environment to serve as an antenna in a wireless communication system to receive an applied electromagnetic communication signal and transmit it to a subsequent communication signal detect-demodulator. The key for the levitated particle to achieve the electromagnetic communication function is that a charge measure-regulator generates a quantity of free charges around the particle and achieves accurate regulation and measurement on the net charge quantity of the particle. Before wireless signal communication is performed, it is required to use an electromagnetic response calibrator to obtain prior information of the communication system, which includes a background noise and a transfer function and the like of the levitated particle. In an actual wireless signal communication process, measurement and regulation of charge and electromagnetic response calibration are no longer performed but the applied electromagnetic communication signal is directly sent. Further, the communication signal detect-demodulator firstly detects a motion response of the levitated particle and then recovers and demodulates symbols of the applied electromagnetic communication signal by using data processing method. In this way, a complete wireless signal communication function is achieved.

In the present disclosure, reception and recovery of the applied electromagnetic communication signal are achieved by using the levitated particle. The levitated particle is several orders of magnitude lower in size than the antenna, and can solve the problem of the huge volume of the antenna in the wireless communication system. Furthermore, the method and device for performing signal communication based on a levitated particle have higher reception sensitivity and thus can receive weaker wireless signal, so as to effectively improve the range of signal power detected by the wireless communication system.

In order to achieve the above purpose, according to a first aspect of the present disclosure, there is provided a method of performing signal communication based on a levitated particle, which includes the following steps:
1) preparing a levitated state of the particle;
2) regulating and measuring the net charge quantity carried by the levitated particle;
3) calibrating electromagnetic response characteristics of the levitated particle;
4) applying an electromagnetic communication signal;
5) obtaining and demodulating the electromagnetic communication signal.

In the step 1), the levitated state of the particle refers to a non-contact bound state in which the particle is under an applied electromagnetic field; the applied electromagnetic field includes a tightly-focused beam, a levitated electric field or a levitated magnetic field. Furthermore, the environment for particle levitation includes air, or vacuum, and different environments for levitation corresponding to different communication sensitivities.

In the step 2), for the regulation approach of the levitated particle, reference can be made to the Chinese patent application with the application No. 202210137538.1 and the publication number CN 114189172 A entitled "method and device for accurately regulating net charge quantity of particle" filed on Feb. 15, 2022 by the applicant, the contents of which are incorporated herein by reference. No redundant descriptions are made herein.

In the step 3), the electromagnetic response characteristics of the levitated particle can include: a background noise of the levitated particle; and an electromagnetic response transfer function of the levitated particle.

In the step 4), applying the electromagnetic communication signal can include: generating an electric field by using a parallel electrode; or, generating a magnetic field by using a permanent magnet or electromagnet.

In the step 5), obtaining and demodulating the electromagnetic communication signal can include: filtering out the background noise of the levitated particle; compensating the electromagnetic response transfer function to obtain a recovered signal; converting the recovered signal form frequency domain to time domain; demodulating symbols of the recovered signal; calculating a bit error between demodulated symbols and initial symbols.

According to another aspect of the present disclosure, there is provided a device for performing signal communication based on a levitated particle, which includes: a levitation trapper, a charge measure-regulator, an electromagnetic response calibrator and a communication signal detect-demodulator. The levitation trapper is configured to levitate a particle in a non-contact manner in an environment; the charge measure-regulator is configured to generate free charges around the levitated particle and regulate and measure the net charge quantity carried by the levitated particle; the electromagnetic response calibrator is configured to obtain, in advance, necessary prior information of the levitated particle including a background noise of the levitated particle and an electromagnetic response transfer function of the levitated particle in frequency domain; the communication signal detect-demodulator is configured to detect a motion response of the levitated particle under the electromagnetic communication signal, and based on the background noise and the electromagnetic response transfer function of the levitated particle, recover the applied electromagnetic communication signal from the detected motion response and demodulate symbols of the recovered electromagnetic communication signal.

The charge measure-regulator can be located inside the levitation trapper to act directly on the levitated particle and measure the net charge quantity of the trapped levitated particle. The electromagnetic response calibrator can be located outside the levitation trapper to obtain the background noise and to act on the levitated particle by applying an electromagnetic communication signal to obtain the electromagnetic response transfer function of the levitated particle. The communication signal detect-demodulator is located in a signal reception direction outside the levitation trapper to detect the motion response of the levitated particle under the electromagnetic communication signal.

The size of the levitated particle can change depending on the levitation solution. For example, for an optical trap levitation solution, typical levitated particle is spherical silica particle with sizes ranging from a hundred nanometers to ten microns in magnitude.

The applied electromagnetic communication signal is not limited to a specific modulation format. For example, the signals of various modulation formats such as amplitude modulation, frequency modulation and phase modulation are all applicable to achieving wireless communication by the device of the present disclosure. Furthermore, a transmission power, a peak point frequency and a frequency band width of the applied electromagnetic communication signal are also adjustable.

The method and device for performing signal communication based on a levitated particle according to the embodiments of the present disclosure have the following beneficial effects.

1) Since the levitated particle for receiving the electromagnetic communication signal is extremely tiny, they have the advantage of helping the miniaturization and integration of the corresponding communication system.

2) Compared with related communication solutions, the reception sensitivity of the device for signal communication according to the embodiments of the present disclosure can increase along with the increase of the vacuum degree.

3) Due to the characteristics of the levitated particle, the device for performing signal communication according to the embodiments of the present disclosure is free in size from the communication frequency band and thus can be applied to the electromagnetic communication signal of broad frequency band.

In conclusion, for communication of wireless signal using a tiny particle, the method and device for performing signal communication according to the embodiments of the present disclosure provide an effective solution for the miniaturization and high sensitivity of the wireless communication system and therefore can have wide application value in many fields such as integrated chip and satellite communication.

Figure 3:
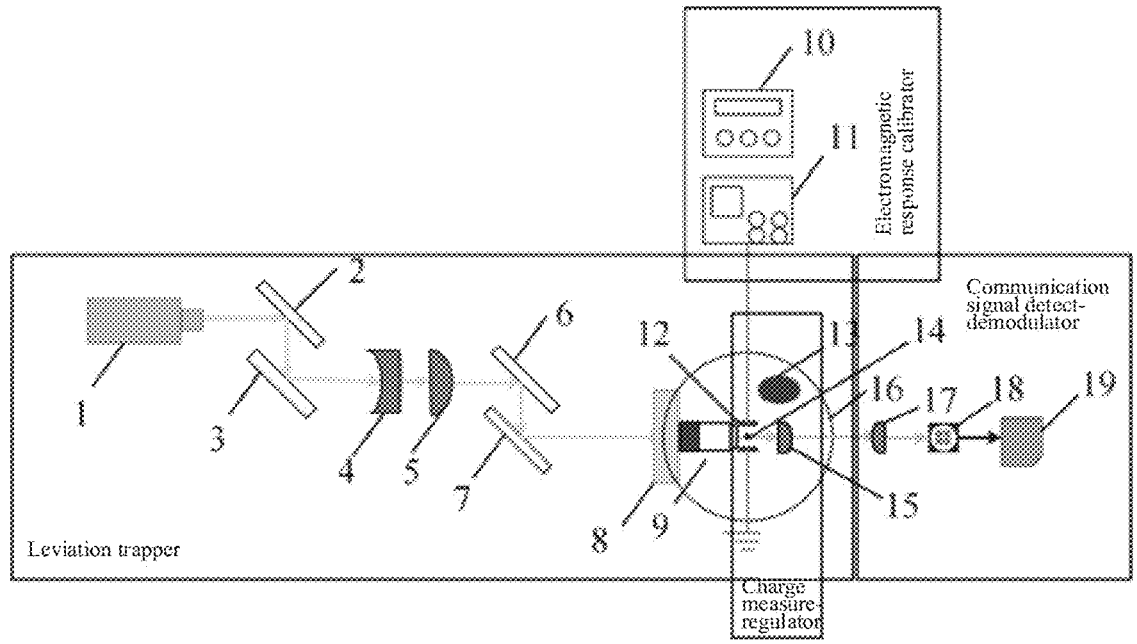
FIG. 3 is a structural schematic diagram illustrating an application example of a device for performing signal communication based on a levitated particle according to embodiments of the present disclosure.

Numerals in the drawing FIG. 3 are described below:
1. laser device
2. first mirror, 3. second mirror;
4. beam expander secondary lens, 5. beam expander primary lens,
6. third mirror, 7. fourth mirror;
8. vacuum chamber window
9. microscope objective,
10. signal generator, 11. high-voltage amplifier,
12. plate electrode, 13. high-voltage electrode
14. levitated particle,
15. condenser lens, 16. vacuum chamber, 17. convergent lens,
18. four-quadrant photoelectric detector
19. lock-in amplifier

DETAILED DESCRIPTION

The present disclosure will be further described below in combination with drawings and specific embodiments.

Figure 1:
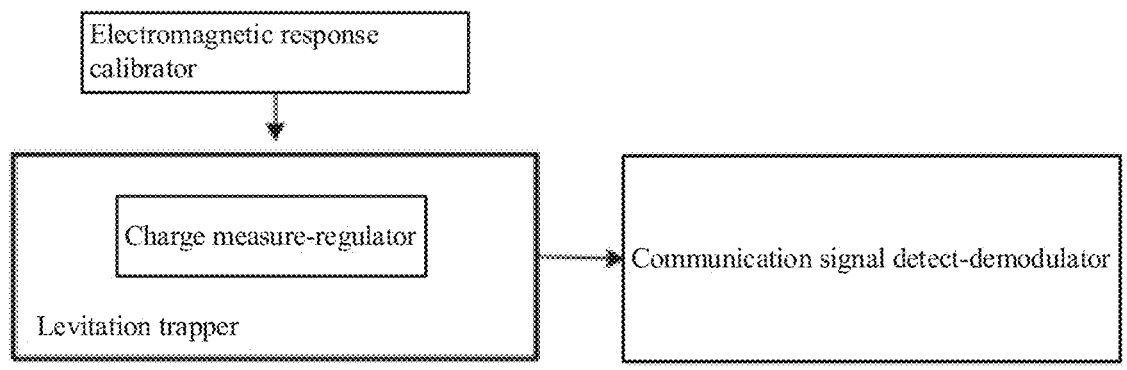
FIG. 1 is a structural schematic diagram illustrating a device for performing signal communication based on a levitated particle according to embodiments of the present disclosure.
Figure 2:
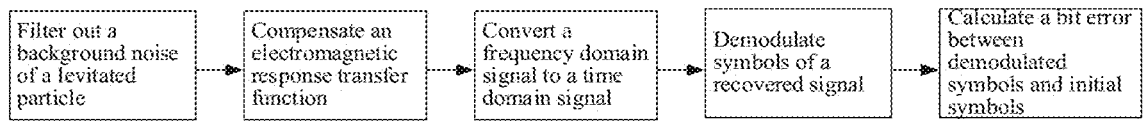
FIG. 2 is a flowchart illustrating signal recovery and demodulation in signal communication based on a levitated particle according to embodiments of the present disclosure.

FIG. 1 is a structural schematic diagram illustrating a device for performing signal communication based on a levitated particle according to embodiments of the present disclosure. FIG. 2 is a flowchart illustrating signal recovery and demodulation in signal communication based on a levitated particle according to embodiments of the present disclosure.

A levitation trapper is configured to stably levitate a particle in a levitation system. The stable levitation refers to the trapped particle vibrate with a small amplitude at a resonant frequency near a balance position of a potential well.

A charge measure-regulator is configured to generate free charges around the levitated particle to accurately regulate and measure the net charge quantity carried by the levitated particle. The free charges can be generated in any manner well known to persons skilled in the art, for example, by high voltage glow discharge, ultraviolet irradiation discharge, cathode ray or thermionic emission or the like.

An electromagnetic response calibrator is configured to obtain a background noise of the levitated particle under no electromagnetic communication signal and take the obtained background noise of the levitated particle as prior information of the subsequent data processing.

By using a frequency sweep function of the electromagnetic response calibrator, a single-frequency harmonic signal with varying frequency is applied to the levitated particle to obtain an electromagnetic response transfer function of the levitated particle, and take the obtained electromagnetic response transfer function of the levitated particle as prior information of the subsequent data processing.

A communication signal detect-demodulator is configured to detect a motion response of the levitated particle to which the electromagnetic communication signal is applied, and perform data processing operation shown in FIG. 2 on frequency domain information of a detected displacement signal of the levitated particle. In some embodiments, the data processing operation can include: by using two pieces of pre-obtained prior information, i.e., the background noise and the electromagnetic response transfer function of the levitated particle, filtering out the influence of the background noise on the electromagnetic communication signal in frequency domain, and compensating an influence of the electromagnetic response transfer function on a frequency amplitude of the electromagnetic communication signal to obtain data of a frequency domain of a recovered electromagnetic communication signal; then, by inverse Fourier transform, obtaining a time domain signal of the recovered electromagnetic communication signal, and demodulating a time domain signal to obtain symbols of the recovered electromagnetic communication signal. By comparing the symbol sequence demodulated at a receiver and the symbol sequence transmitted at a sender, a bit error rate of the communication system can be calculated.

The trapping manner adopted by the levitation trapper can include tightly-focused beam trapping, levitated electric field trapping, and levitated magnetic field trapping and the like, and it is required that a potential energy of the trapper for binding the particle should be far greater than an average kinetic energy of the Brownian movement of the levitated particle.

The size of the levitated particle can change depending on the levitation solution in levitation trapper. For example, for an optical trap levitation solution, the typical levitated particle is spherical silica particle with sizes ranging from a hundred nanometers to ten microns in magnitude.

The levitation system in which the particle is located includes air system, vacuum system and the like. Generally, different levitation systems correspond to different communication sensitivities.

The applied electromagnetic communication signal includes signals of various modulation formats such as amplitude modulation, frequency modulation and phase modulation. In amplitude modulation, binary amplitude shift keying is usually used. When the symbol is 1, the carrier wave is directly passed; when the symbol is 0, the carrier wave is not passed. The frequency domain of the amplitude-modulated signal only has one peak of the carrier frequency. In frequency modulation, binary frequency shift keying is usually used. When the symbol is 1, the carrier frequency is f1; when the symbol is 0, the carrier frequency is f2. In this case, there are two peak values f1 and f2 in the frequency-modulated signal. In phase modulation, binary phase shift keying is usually used. When the symbol is 1, the carrier phase is 0 degree; when the symbol is 0, the carrier phase is 180 degrees. Thus, the frequency domain of the phase-modulated signal only has one peak of the carrier frequency.

The charge measure-regulator and the electromagnetic response calibrator are configured to perform measurement and calibration prior to signal communication, and only one operation is required, all subsequent electromagnetic signal communication processes do not require measurement and calibration any more.

During the charge measurement and regulation, electromagnetic response characteristic calibration and electromagnetic signal communication processes, the environments where the levitated particle is located should be consistent, for example, the vacuum environments should have a same vacuum degree.

APPLICATION EXAMPLE 1

FIG. 3 is a structural schematic diagram illustrating the device of the application example 1. In the application example 1, the electromagnetic communication signal of binary frequency shift keying is taken as an example. In a vacuum system, a levitated particle with the radius of 75 nanometers is used to achieve relatively accurate wireless signal communication. The levitation trapper shown in FIG. 3 binds the levitated particle in the vacuum system near the potential well by tightly-focused beam. In some embodiments, a core device of the levitation trapper is a 1064-nanometer high power laser device 1. A trapping laser beam emitted by the high-power laser device 1 is transmitted along a horizontal direction, and then reflected sequentially by a first mirror 2 and a second mirror 3 disposed face to face and parallel, and then transmitted into a laser beam expansion system including a beam expander secondary lens 4 and a beam expander primary lens 5. As shown in FIG. 3, the laser beam sequentially runs through the beam expander secondary lens 4 and the beam expander primary lens 5 for beam expansion and collimation, and then reflected sequentially by a third mirror 6 and a fourth mirror 7 disposed face to face and parallel, and then transmitted into a vacuum chamber 16 through a vacuum chamber window 8. In the vacuum chamber 16, the trapped light is coupled into a microscope objective 9 to obtain an optical trap capable of stably trapping a nano-particle. Correspondingly, after the particle is levitated, a condenser lens 15 is configured to collect a forward scattered light which can be detected by the subsequent communication signal detect-demodulator. The levitated particle 14 can be a spherical silica particle with the radius of 75 nanometers. After being diluted, the levitated particle is sent to the vacuum chamber 16 by spray load. After the levitated particle is trapped, the charge measure-regulator generates free charges around the levitated particle and measure the net charge quantity carried by the particle.

The free charges can be generated by high voltage glow discharge. For example, in the vacuum chamber 16, an additional high voltage electrode 13 is applied to perform electric discharge on gas molecules in the chamber, and by adjusting a voltage applied to a plate electrode 12, the levitated particle is enabled to carry a quantity of net charges. Then, by using a lock-in amplifier 19, the net charge quantity carried by the levitated particle is measured to obtain the net charge quantity of the particle as 5.

Figure 4:
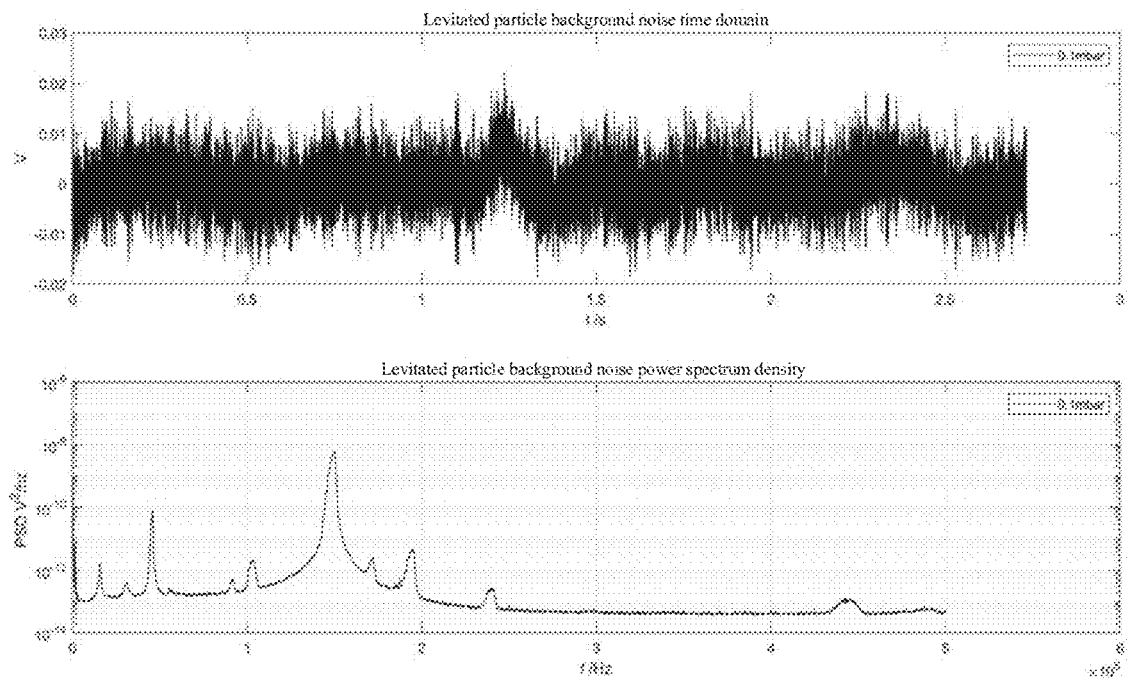
FIG. 4 is a schematic diagram illustrating a background noise of the levitated particle in the application example of FIG. 3.
Figure 5:
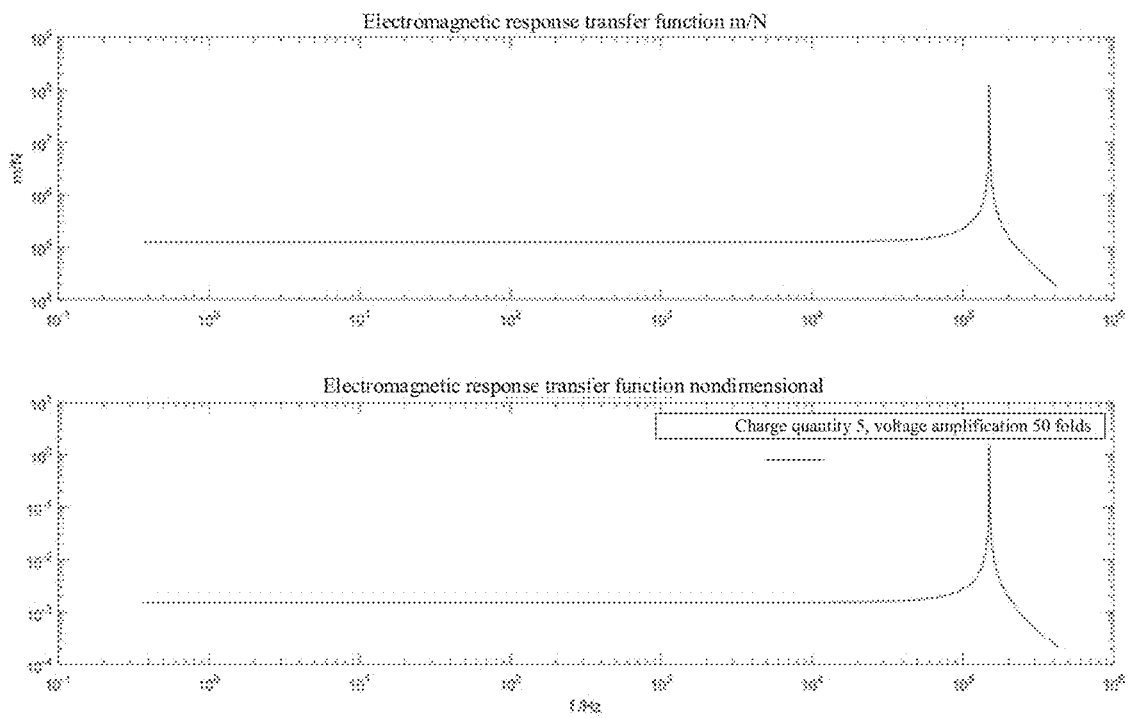
FIG. 5 is a schematic diagram illustrating an electromagnetic response transfer function of the levitated particle in the application example of FIG. 3.

After the charge measurement and regulation is completed, the electromagnetic response calibrator is used to measure a background noise and an electromagnetic response transfer function of the levitated particle sequentially. The background noise and the electromagnetic response transfer function herein are both measured under an air pressure of about 0.1 mbar as shown in FIG. 4 and FIG. 5 respectively. The background noise is a motion response of the levitated particle to which the electromagnetic communication signal is not applied. The resonant frequency of the levitated particle measured in FIG. 4 is 150 kHz. The electromagnetic response transfer function is obtained by applying a single-frequency harmonic signal with the frequency changing continuously from low to high to the levitated particle by using a frequency sweep function of a signal generator 10. The harmonic signal output by the signal generator 10 goes through a 50-fold high voltage amplifier 11 and then connects with an end of the plate electrode 12, and the other end of the plate electrode 12 is earthed. FIG. 5 shows a maximum electromagnetic response at the frequency domain of 150 KHz.

After the electromagnetic communication signal is applied, charge measurement and electromagnetic response calibration are no longer performed.

Figure 6:
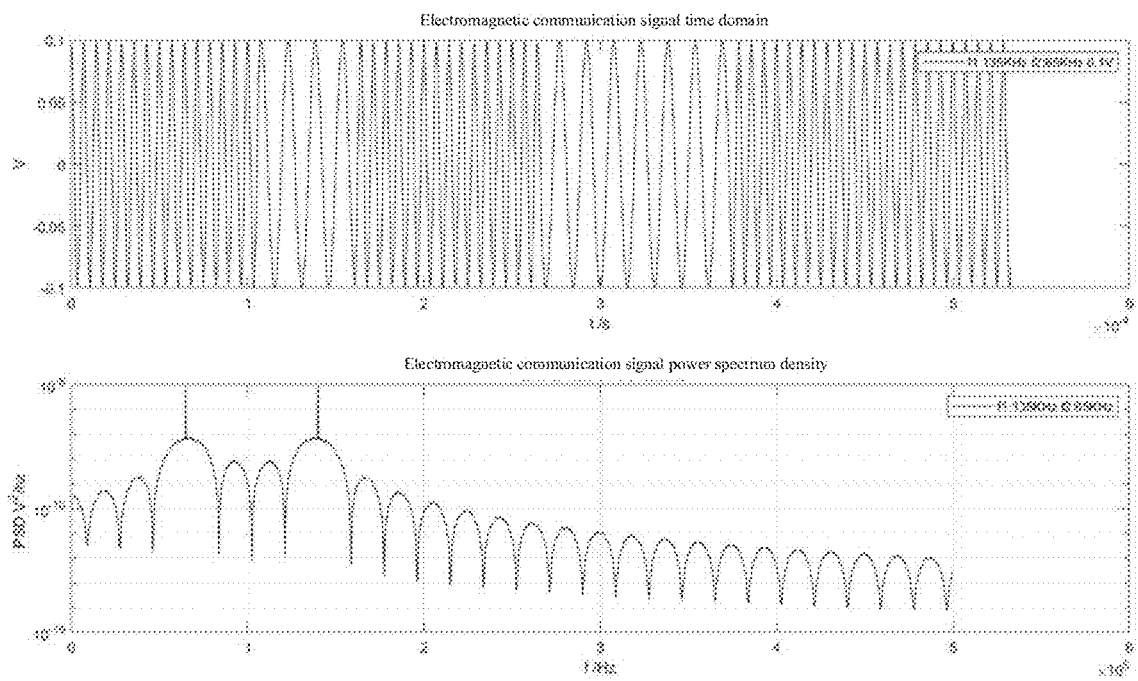
FIG. 6 is a schematic diagram illustrating an applied electromagnetic communication signal applied in the application example of FIG. 3.
Figure 7:
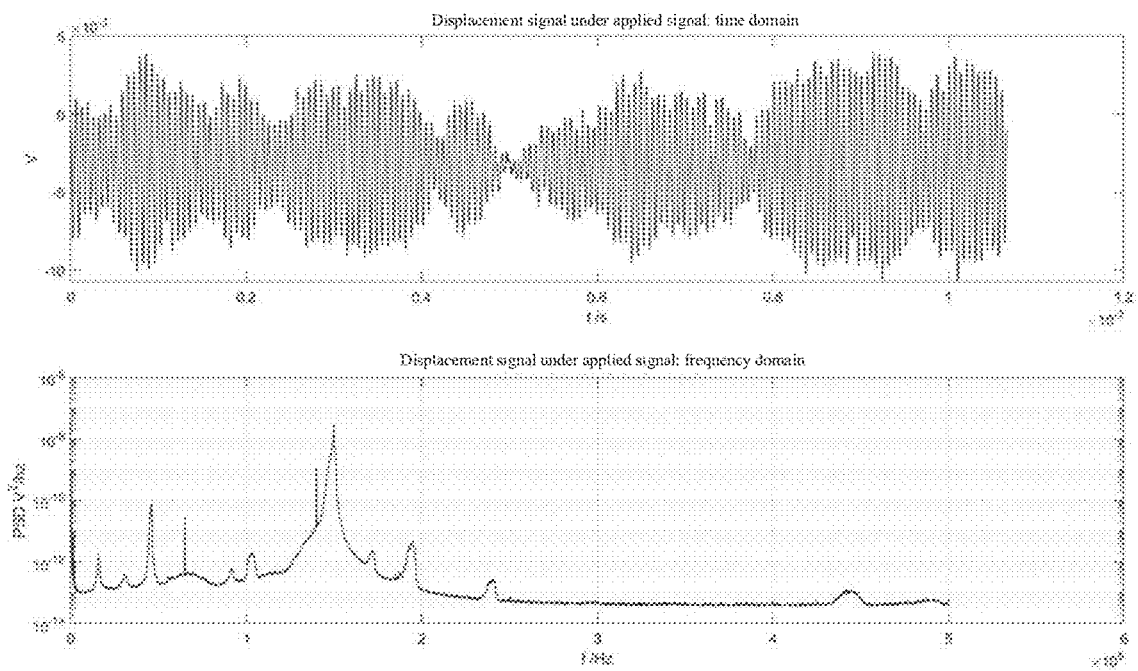
FIG. 7 is a schematic diagram illustrating a motion response of the levitated particle under the applied electromagnetic communication signal in the application example of FIG. 3.

The applied electromagnetic communication signal, as shown in FIG. 6, is a binary frequency shift keying signal with two carrier frequencies which are a first carrier frequency 135 kHz and a second carrier frequency 65 kHz, where the amplitude of the signal is 0.1V. Under the air pressure of about 0.1 mbar, a convergent lens 17 of the communication signal detect-demodulator can converge the detection light to a light-sensing region of a four-quadrant photoelectric detector 18. The motion response of the levitated particle detected under the electromagnetic communication signal is as shown in FIG. 7. In FIG. 7, it can be seen that the frequency domain information of the electromagnetic communication signal is superimposed on the background noise of the levitated particle, and under the influence of the electromagnetic response transfer function, a peak value of the first carrier frequency (135 kHz) closer to the resonant frequency (150 kHz) is higher than a peak value of the second carrier frequency (65 kHz) farther from the resonant frequency (150 kHz). By using the lock-in amplifier 19, the motion response is stored for subsequent data processing.

In one embodiment of the present disclosure, performing data processing on the motion response can include: filtering out the influence of the background noise of the levitated particle on the electromagnetic communication signal, and then correcting the signal frequency by using the electromagnetic response transfer function obtained in advance, that is, compensating the influence of the electromagnetic response transfer function on the signal frequency, such that a signal response value at any frequency is same and unrelated to the resonant frequency; after obtaining frequency domain data of the corrected signal, performing inverse Fourier transform on the frequency domain data to obtain recovered time domain data; finally, demodulating the time domain data to obtain symbols of the recovered electromagnetic communication signal.

Figure 8:
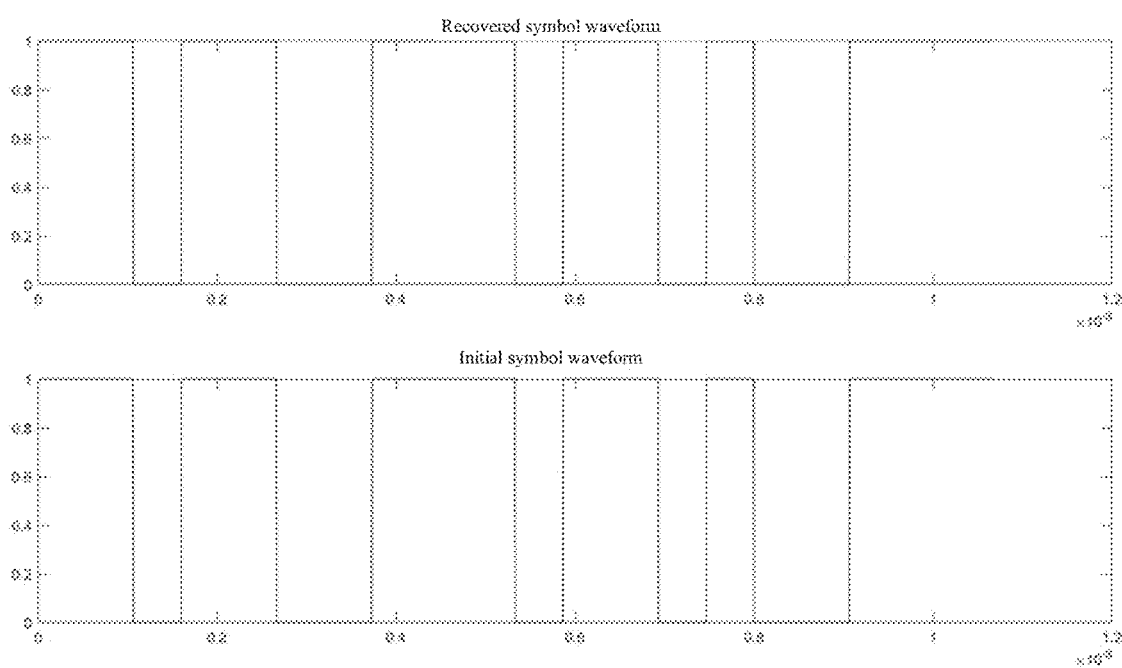
FIG. 8 is a schematic diagram illustrating symbols demodulated by data processing in the application example of FIG. 3.

FIG. 8 shows comparison of a recovered symbol sequence and an initial symbol sequence. It is obvious that the bit error rate calculated in this embodiment is 0.

In conclusion, wireless signal communication is achieved based on a levitated particle. Since the size of the levitated particle is smaller than the size of the antenna device, the communication device based on a levitated particle has an advantage of miniaturization, and the communication sensitivity of the communication device is also superior to the related antenna communication solution.

The applied electromagnetic communication signal can be applied by using the plate electrode in this embodiment or by another method, for example, by generating a magnetic field using permanent magnet or electromagnet.

In addition to the binary frequency shift keying in the embodiments, the modulation format of the applied electromagnetic communication signal can also be a more complex modulation format, for example, quadrature phase shift keying. Furthermore, the applied electromagnetic communication signal can also be in a shape of sine wave as well as rectangular wave or triangular wave.

The device for performing signal communication based on a levitated particle can achieve accurate wireless signal communication based on a levitated particle. The size of the levitated particle is several orders of magnitude lower than that of the antenna device, and the size of the device does not need to change along with the change of frequency band.

The device for performing signal communication based on a levitated particle in the present disclosure has a reception sensitivity superior to related communication solution, and thus can achieve wireless communication of weaker signal.

In the method of performing signal communication based on a levitated particle in the present disclosure, recovery for the electromagnetic communication signal can be achieved in the mixed information of the background noise and the electromagnetic communication signal, and the bit error rate calculated by comparing the recovered symbols and the initial symbols is extremely low.

In the present disclosure, before the electromagnetic communication signal is applied to the levitated particle, net charge quantity measurement and regulation and electromagnetic response calibration shall be performed in advance to obtain the prior information such as the background noise and the electromagnetic response transfer function of the levitated particle for subsequent data processing operation in signal communication.

In the method of performing signal communication based on a levitated particle in the present disclosure, data processing operation is performed on the frequency domain data of the motion response of the levitated particle to remove the influence of the background noise and the electromagnetic response transfer function on the electromagnetic communication signal, and obtain recovered time domain information by inverse Fourier transform.

In the present disclosure, communication tasks of the electromagnetic communication signals with various modulation formats can be achieved, where the modulation formats can include binary frequency shift keying, binary phase shift keying and binary amplitude shift keying and the like.

In the present disclosure, it is the first time to use levitated particle to perform accurate communication of wireless signals. Compared with related antenna devices of the communication system, since the size of the levitated particle for receiving the electromagnetic communication signal is extremely small, the device in the present disclosure has an advantage of miniaturization and integration.

The present disclosure is applicable to the electromagnetic communication signals of broad frequency band and the size of the communication modules is free from the influence of the communication frequency band.

The device for performing signal communication based on a levitated particle in the present disclosure has a reception sensitivity increasing along with the increase of the vacuum degree, and thus its reception sensitivity is superior to related communication solutions.

The implementation solutions described above are used to describe the embodiments of the present disclosure rather than limit the idea and scope of the present disclosure. Various changes and improvements made to the technical solutions of the present disclosure by those skilled in the art without departing from the design idea of the present disclosure shall fall within the scope of protection of the present disclosure. The scope of protection of the present disclosure is indicated by the claims and its equivalents.

The invention claimed is:

1. A method of performing signal communication based on a levitated particle, the method comprising:
   preparing a levitated state of a particle, wherein the levitated state of the particle refers to the particle being levitated in a non-contact bound state in an environment;
   regulating and measuring a net charge quantity carried by the levitated particle;
   calibrating electromagnetic response characteristics of the levitated particle;
   applying an electromagnetic communication signal;
   obtaining a motion response of the levitated particle to which the electromagnetic communication signal is applied; and
   demodulating, based on the motion response, symbols of the electromagnetic communication signal.

2. The method of claim 1, wherein,
   the particle enters the non-contact bound state under an applied electromagnetic field; and
   the applied electromagnetic field comprises a tightly-focused beam, a levitated electric field or a levitated magnetic field.

3. The method of claim 1, wherein the environment for the particle levitation comprises air, vacuum, and different environments for levitation corresponding to different communication sensitivities.

4. The method of claim 1, wherein the electromagnetic response characteristics of the levitated particle comprise:
   a background noise of the levitated particle; and
   an electromagnetic response transfer function of the levitated particle.

5. The method of claim 1, wherein applying the electromagnetic communication signal comprises:
   generating an electric field by utilizing a parallel electrode; and,
   generating a magnetic field by utilizing a permanent magnet or electromagnet.

6. The method of claim 1, wherein demodulating, based on the motion response, the symbols of the electromagnetic communication signal comprises:
   for the electromagnetic communication signal, filtering out a background noise of the levitated particle and compensating for an electromagnetic response transfer function, to obtain a recovered signal;
   converting the recovered signal from a frequency domain to a time domain;
   demodulating the time domain of the recovered signal to obtain symbols of the recovered signal; and
   calculating a bit error between the demodulated symbols and initial symbols.

7. A device for performing signal communication based on a levitated particle, the device comprising:
   a levitation trapper configured to levitate a particle in a non-contact manner in an environment;
   a charge measure-regulator configured to generate free charges around the levitated particle, and regulate and measure a net charge quantity carried by the levitated particle;
   an electromagnetic response calibrator, configured to measure a background noise and measure an electromagnetic response transfer function of the levitated particle by applying an electromagnetic communication signal to the levitated particle; and
   a communication signal detect-demodulator, configured to detect a motion response of the levitated particle under the electromagnetic communication signal, and based on the background noise and the electromagnetic response transfer function of the levitated particle, recover the electromagnetic communication signal from the detected motion response, and demodulate symbols of the electromagnetic communication signal.

8. The device of claim 7, wherein,
   the charge measure-regulator is located inside the levitation trapper.

9. The device of claim 7, wherein the electromagnetic response calibrator is located outside the levitation trapper.

10. The device of claim 7, wherein the communication signal detect-demodulator is located in a signal reception direction outside the levitation trapper.

* * * * *